(12) United States Patent
Ogawa

(10) Patent No.: US 8,524,024 B2
(45) Date of Patent: Sep. 3, 2013

(54) METHOD AND APPARATUS FOR PRODUCING GREEN TIRES

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 301 days.

(21) Appl. No.: 12/936,685

(22) PCT Filed: Mar. 11, 2009

(86) PCT No.: PCT/JP2009/054676
§ 371 (c)(1),
(2), (4) Date: Nov. 22, 2010

(87) PCT Pub. No.: WO2009/125643
PCT Pub. Date: Oct. 15, 2009

(65) Prior Publication Data
US 2011/0100531 A1  May 5, 2011

(30) Foreign Application Priority Data
Apr. 8, 2008 (JP) ................. 2008-099993

(51) Int. Cl.
*B29D 30/30* (2006.01)
*B29D 30/60* (2006.01)

(52) U.S. Cl.
USPC ........... 156/117; 156/130; 156/395; 156/397; 156/406.4

(58) Field of Classification Search
USPC ........... 156/117, 130, 395, 397, 405.1, 406.4, 156/764, 766
See application file for complete search history.

(56) References Cited

U.S. PATENT DOCUMENTS

| 3,899,383 | A * | 8/1975 | Schultz et al. ............... 156/396 |
| 4,105,488 | A * | 8/1978 | Hayes et al. ................. 156/425 |
| 6,554,041 | B1 | 4/2003 | Ohki et al. |
| 6,989,067 | B2 * | 1/2006 | Armstrong et al. ........... 156/187 |
| 2009/0026243 | A1 | 1/2009 | Marangoni et al. |

FOREIGN PATENT DOCUMENTS

| JP | A-2000-246812 | 9/2000 |
| JP | A-2004-216603 | 8/2004 |
| JP | A-2005-111749 | 4/2005 |
| WO | WO 2007/045684 A1 | 4/2007 |

OTHER PUBLICATIONS

Extended European Search Report issued in European Patent Application No. 09731274.8 dated Oct. 10, 2011.
International Search Report for International Patent Application No. PCT/JP2009/054676, mailed on Jun. 9, 2009 (w/ English translation).

* cited by examiner

*Primary Examiner* — Geoffrey L Knable
(74) *Attorney, Agent, or Firm* — Oliff & Berridge, PLC

(57) ABSTRACT

An unvulcanized rubber member passed from the transfer terminal end of a liner to the outer peripheral surface of a winding roller is transferred and press-fitted to a winding body by rotating the winding roller. By this, the unvulcanized rubber member is transferred from the transfer terminal end of the liner to the winding body while being restrained by an outer peripheral surface of the winding roller. Thus, even if vibration is applied to a transfer means due to a diagonal waving, the winding position and the wound shape of the rubber member can be maintained substantially unchanged.

8 Claims, 4 Drawing Sheets

US 8,524,024 B2

METHOD AND APPARATUS FOR PRODUCING GREEN TIRES

TECHNICAL FIELD

The present invention relates to a method and an apparatus for producing green tires by winding a ribbon-like unvulcanized rubber member multiple times around a winding body.

BACKGROUND ART

Conventional method and apparatus for producing green tires are disclosed, for example, in Patent Document 1 identified below.

More particularly, in FIGS. 1 and 5 of Patent Document 1, there is disclosed an apparatus provided with: a transfer means including a flexible endless tape capable of running in its longitudinal direction for transferring a rubber strip toward a former rotatable about its center axis, and turned back multiple times vertically in the midcourse to form festoons, as well as a guide roller for turning back the endless tape and thereby separating the rubber strip from the endless tape at a transfer terminal end of the endless tape; a small diameter pressing roller for urging and press-fitting the rubber strip separated from the endless tape and passed through air and brought into contact with the outer surface of the former, at the contact position of the rubber strip; and a traverser for moving at least the pressing roller and the guide roller along the outer surface of the former, thereby winding the rubber strip multiple times around the former while being shifted in a width direction.

Furthermore, in FIG. 7 of Patent Document 1, there is disclosed an apparatus provided with: a transfer means including a flexible endless tape capable of running in its longitudinal direction for transferring a rubber strip toward a former rotatable about its center axis, and turned back multiple times vertically in the midcourse to form festoons, as well as a guide roller for turning back the endless tape at a transfer terminal end of the endless tape; a swivel means for causing a swivel movement of the transfer terminal end portion of the endless tape to approach the former, urging the guide roller against the former, and thereby separating the rubber strip from the endless tape and transferring it to the former; and a traverser for moving at least the guide roller along the outer surface of the former, thereby winding the rubber strip multiple times around the former while being shifted in a width direction.

Patent Document 1: JP 2000-246812A

DISCLOSURE OF THE INVENTION

Task to be Solved by the Invention

However, in the former type of known apparatus, since the rubber strip is passed through air between the transfer terminal end of the endless tape and the former, when vibration is applied to the transfer means from the traverser or the like, the rubber strip passing through air undergoes vibration with large amplitude. Such vibration deteriorates the accuracy of the winding position and the winding shape of the rubber strip with respect to the former, thereby degrading the quality of the green tires.

On the other hand, in the latter type of the known apparatus, since the rubber strip is intensively urged against the endless tape as it passes the festoon, when the rubber strip is transferred from the transfer means (endless tape) to the former, there is instance wherein the rubber strip is more or less dragged in adhesion to the endless tape in its return path side, before the rubber strip is separated from, and wound onto the former. On such occasion, the rubber strip is locally stretched to float from the former, thereby giving rise to a problem of air trap in the green tire.

The task of the present invention is to provide a method and an apparatus for producing green tires, wherein the unvulcanized rubber strip can be highly precisely wound onto the winding body while suppressing floating up of the rubber member.

Means for Solving the Task

To this end, a first aspect of the present invention resides in a method for producing green tires, comprising the steps of: transferring a ribbon-like unvulcanized rubber member toward a winding body by running a flexible liner in its longitudinal direction, and separating the unvulcanized rubber from the liner at a transfer end of the liner by turning back the liner by a separating member arranged close to the winding body; and using a winding roller arranged close to the transfer terminal end of the liner and having a diameter larger than a distance between the winding body and the transfer terminal end of the liner during winding of the unvulcanized rubber member, the winding roller having an outer peripheral surface which partly extends to bridge the transfer terminal end and the winding body, passing the separated unvulcanized rubber member onto the outer peripheral surface of the winding roller, rotating the winding roller so that the unvulcanized rubber member is transferred to the winding body while the winding body is rotating about its center axis so as to be urged and press-fitted to the winding body, and simultaneously moving the winding roller and the separating member along an outer peripheral surface of the winding body by a diagonal waving means, thereby winding the unvulcanized rubber member multiple times around the winding body while being shifted in a width direction.

As used herein, the term "diagonal waving means" is to be interpreted to refer to means for causing a relative movement of the unvulcanized rubber member in the width direction of the winding body, when the unvulcanized rubber member is wound onto about the winding body in order to form a constitutive member of a green tire of a predetermined shape.

A second aspect of the present invention resides in an apparatus for producing green tires, comprising: a transfer means including a flexible liner movable in a longitudinal direction for transferring a ribbon-like unvulcanized rubber member toward a winding body rotatable about a center axis, and a separating member arranged close to the winding body, for turning back the liner and thereby separating the unvulcanized rubber member from the liner at a transfer terminal end of the liner; a rotatable winding roller arranged close to the transfer terminal end of the liner and having a diameter larger than a distance between the winding body and the transfer terminal end of the liner during winding of the unvulcanized rubber member, the winding roller having an outer peripheral surface which partly extends to bridge the transfer terminal end and the winding body, so that the unvulcanized rubber member passed from the transfer terminal end of the liner is passed onto the outer peripheral surface of the winding roller during rotation thereof, and urged and press-fitted to the winding body; and a diagonal waving means for moving at least the winding roller and separating member along an outer peripheral surface of the winding body, thereby winding the unvulcanized rubber member multiple times around the winding body while being shifted in a width direction.

Effects of the Invention

According to the present invention, since the rotatable winding roller is arranged close to the transfer terminal end of the liner and has a diameter larger than a distance between the winding body and the transfer terminal end of the liner, and the outer peripheral surface of the winding roller partly extends to bridge the transfer terminal end and the winding body, the unvulcanized rubber member passed from the transfer terminal end of the liner is transferred to the outer peripheral surface of the winding roller by the rotation of the winding roller and urged and press-fitted to the winding body. Thus, the unvulcanized rubber member is transferred from the transfer terminal end of the liner to the outer peripheral surface of the winding roller, while being restrained by the outer peripheral surface of the winding roller. As a result, even when vibration is applied to the transfer means due to diagonal waving, it is possible to positively avoid occurrence of inaccuracy in the winding position or the winding shape.

Moreover, since the unvulcanized rubber member is once separated from the separating member at the transfer terminal end of the liner and then transferred by the winding roller to the winding body so as to be wound around the winding body, even when the adhesion force between the liner and the unvulcanized rubber member is strong, the influence of the strong adhesion force is substantially negligible by the above-mentioned separation. Thus, the unvulcanized rubber member is prevented from stretching and floating while being wound onto the winding body. This serves to improve the quality of the green tires.

The structural features as recited in dependent claim 3 serve to readily avoid occurrence of defective adhesion of the trailing end of the unvulcanized rubber member or dislocation of the set position of the leading end, as compared to the case wherein the unvulcanized rubber member after having been cut is supplied to the winding body in the state as it is, i.e. the state wherein the leading end and the trailing end are in abutment with each other. The structural features as recited in dependent claim 4 serve to utilize the adhesion force between the liner and the unvulcanized rubber member to hold the unvulcanized rubber member during the cutting, so as to minimize dislocation of the leading end and the trailing end of the unvulcanized rubber member during the cutting, thereby effectively suppressing unexpected deformation of the unvulcanized rubber member or its re-adhesion to the liner.

The structural features as recited in dependent claim 5 serve to readily ensure that the winding body and the winding roller are driven at the same peripheral speed, immediately after starting the winding of the residual portion, thereby improving the adhesion of the residual portion. The structural features as recited in dependent claim 6 serve to save the installation cost by decreasing the number of expensive drive motors, by allowing the winding roller to undergo a following rotation.

REFERENCE SYMBOLS

Figure 1:
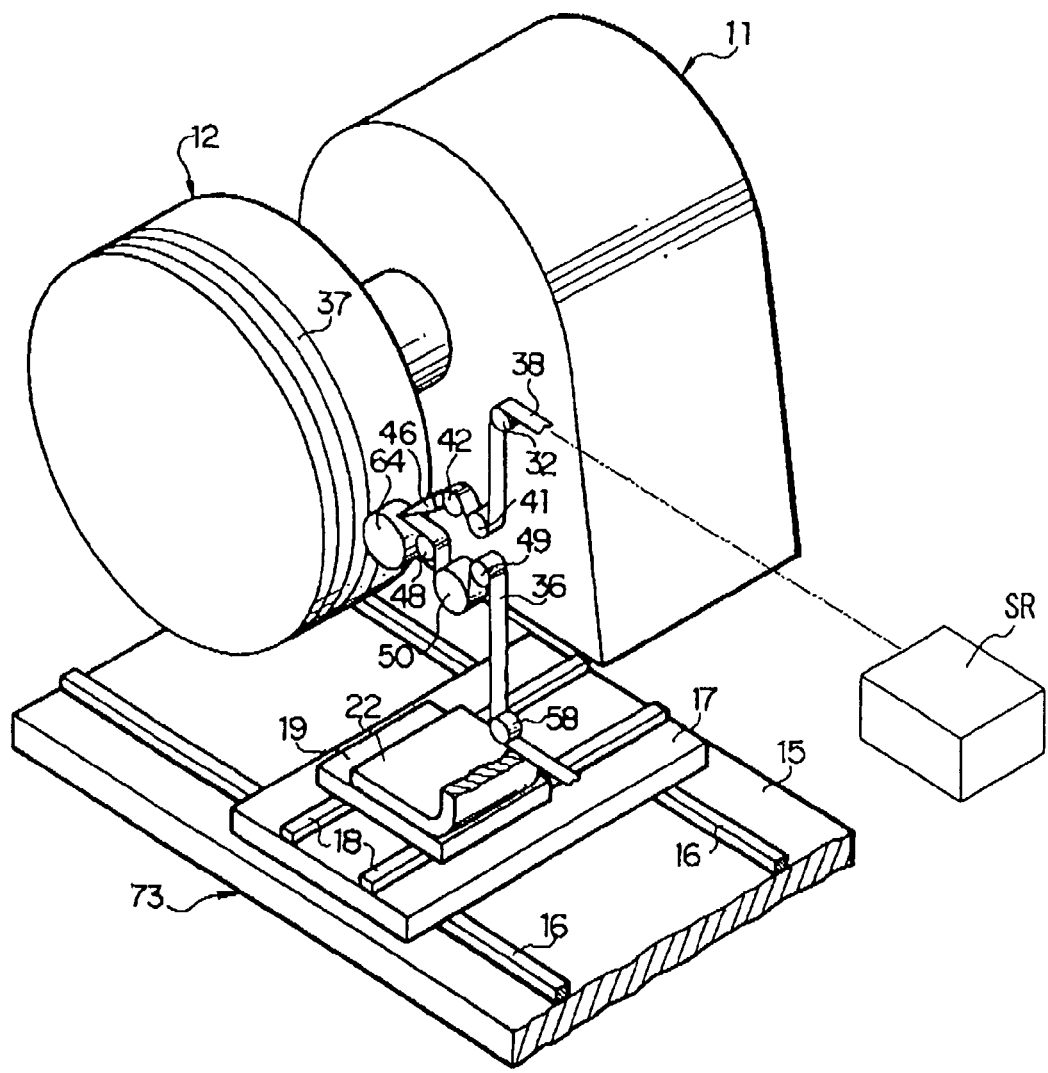
FIG. 1 is a partly broken perspective view schematically showing one embodiment of the present invention.

12 Winding body
36 Liner
37 Unvulcanized rubber member
46 Separating member
47 Transfer terminal end
51 Drive motor
61 Transfer means
64 Winding roller
66 Pressing point
69 One-way clutch
73 Diagonal waving means
78 Cutter blade
81 Cutter means
84 Residual portion

BEST MODE FOR CARRYING OUT THE INVENTION

The present invention will be described below with reference to the preferred embodiment as shown in the drawings. In FIG. 1, reference numeral 11 denotes a driving section installed on a floor surface. A toroidal winding body 12 is rotatably supported by the driving section 11 so as to be rotatable about a horizontal center axis. In this instance, the winding body 12 consists of a rigid core that can be driven by the driving section 11 to rotate about the center axis which extends in the left-to-right direction, having an outer surface of the same shape as the inner surface of (product tire) and capable of being assembled or disassembled, as well as an intermediate tire body comprised of plural kinds of tire constitutive members which are adhered to the periphery of the rigid core. Incidentally, the winding body 12 may be comprised of the rigid core alone, or a cylindrical forming drum and an intermediate tire body built on the forming drum and expanded and deformed to have arcuate cross-section, or the forming drum alone.

Reference numeral 15 denotes a base member installed on the floor surface to extend in the fore-and-aft direction. The base member 15 extends rearwards from a position immediately below the winding body 12. Provided on the base member 15 are guide rails 16 forming a pair, which extend in the fore-and-aft direction. Reference numeral 17 denotes a lower plate in the form of a rectangular plate having a length as measured in the left-to-right direction, which is longer than the width of the winding body 12. The lower plate 17 is movable along the guide rails 16 in the fore-and-aft direction, as being guided by the guide rails 16, by supplying driving force from a drive motor and a screw mechanism, not shown.

Reference numeral 18 denotes horizontal guide rails forming a pair, which are provided on the upper surface of the lower plate 17 to extend in the left-to-right direction. Reference numeral 19 denotes an upper plate in the form of a rectangular plate having a length as measured in the left-to-right direction, which is substantially same as the width of the winding body 12. The upper plate 19 is movable along the guide rails 18 in the left-to-right direction, as being guided by the guide rails 18, by supplying driving force from a drive motor and a screw mechanism, not shown.

A substantially U-shaped support frame 22 having an open front side is fixedly secured to the upper surface of the upper plate 19. A further support frame 23 is fixedly secured to the lower part of the support frame 22 so as to extend horizontally and forwards. Immediately above the support frame 23, there is installed a box-like turntable 25 having open ends on both sides and a lower surface to which a large diameter external gear 24 is fixedly secured. A bearing 26 is interposed between the external gear 24 and the support frame 23 so as to rotatably support the turntable 25 about a vertical rotational axis.

Reference numeral 29 denotes a vertically extending stationary shaft, which is fixedly secured to the support frame 22 immediately above the bearing 26. The stationary shaft 29 serves to support a swivel table 31 through a bearing 30 so as to allow a swiveling movement in a horizontal plane about the stationary shaft 29. Reference numeral 32 denotes an upper guide roller freely rotatably supported on the swivel table 31, wherein the upper guide roller 32 is situated on substantially the same level as a slit 33 that is formed in the support frame 22.

Reference numeral 36 denotes a flexible liner comprised of a narrow, strip-like plastic film. The liner 36 has an outer surface side which supports a narrow, ribbon-like unvulcanized rubber member 37 as being laminated with each other. The liner 36 and the unvulcanized rubber member 37 as a whole constitute a narrow strip member 38. The narrow strip member 38 is unwound from a roll that is supported by an unwinding means, not shown, which is installed on the rear side of the support frame 22, before it is supplied toward the winding body 12. On this occasion, the liner 36 runs in the longitudinal direction to transfer the unvulcanized rubber member 37 toward the winding body 12.

In the illustrated embodiment, narrow strip member 38 is explained as being once wound into a roll shape with the liner 36 and the unvulcanized rubber member 37 laminated with each other, and unwound from the roll whenever necessary. However, the present invention is also applicable to a case wherein the narrow strip member 38 is comprised of the liner 36 which is laminated with the unvulcanized rubber member 37 immediately after it has been extruded from an extruder.

Reference numerals 41, 42 denote pair of guide rollers rotatably supported on the upper end portion of the turntable 25, among which the guide roller 41 is situated immediately below the guide roller 32. The guide roller 42, in turn, is situated closer to the side of the winding body 12 than the guide roller 41. The liner 36 unwound from the above-mentioned roll is passed through the slit 33 and successively comes into contact with the upper guide roller 32 and the guide rollers 41, 42 so as to transfer the unvulcanized rubber member 37 toward the winding body 12. Reference numeral 46 denotes a strip-shaped separating member, which is arranged close to the winding body 12 and, more specifically, on the turntable 25 at a location closer to the side of the winding body 12 than the guide roller 42. The separating member 46 has a distal end portion on the side of the winding body 12, having a thickness gradually decreasing toward the winding body 12, such that the upper and lower surfaces of the distal end portion intersect with each other at an acute angle.

The liner 36 brought into contact with the guide roller 42 continues running in contact with the upper surface of the separating member 46 toward the winding body 12. On this occasion, at the distal end portion of the separating member 46 on the side of the winding body 12, the liner is turned back with an acute angle in a hairpin manner so as to be spaced from the winding body 12. When the liner is turned back in a hairpin manner as described above, the unvulcanized rubber member in adhesion to the liner 36 is separated from the liner 36 in its turn back position, i.e. at the transfer terminal end 47, and thereby released from the support by the liner 36. In the illustrated embodiment, the distal end of the separating member 46 on the side of the winding body 12 is circular with a small radius of curvature. However, the present invention is also applicable to a case wherein a small diameter roller is rotatably supported on the distal end, or the separating member 46, per se, is comprised of a small diameter roller.

Reference numerals 48, 49 denote pair of guide rollers which are rotatably supported by the turntable below the above-mentioned guide rollers 41, 42. Between these guide rollers 48, 49, the turntable 25 rotatably supports a drive roller 50 below the guide rollers 48, 49. The drive roller 50 is connected to an output shaft 52 of a drive motor 51 that is mounted on the turntable 25. The liner 36 separated from the unvulcanized rubber member 37 comes successively into contact with the guide roller 48, the drive roller 50 and the guide roller 49 so that when the drive motor 51 is operated and the drive roller 50 thereby rotates, the liner 36 is applied with a driving force by the drive roller 50 and undergoes running in the longitudinal direction.

Reference numeral 55 denotes a vertically extending stationary shaft, which is fixedly secured to the support frame 22 below the bearing 26, coaxially to the above-mentioned stationary shaft 29. The stationary shaft 55 serves to support a swivel table 57 through a bearing 56 so as to allow a swiveling movement in a horizontal plane about the stationary shaft 55. Reference numeral 58 denotes a lower guide roller freely rotatably supported on the swivel table 57, wherein the lower guide roller 58 is situated on substantially the same level as a slit 59 that is formed in the support frame 22.

The liner 36 separated from the guide roller 49 is passed through a bore 60 extending through the turntable 25, the external gear 24, the bearing 26 and the support plate 23 and then brought into contact with the lower guide roller 58, passed through the slit 59 and wound by a winding means, not shown, which is arranged on the rear side of the support frame 22. The above mentioned liner 36, upper guide roller 32, guide rollers 41, 42, 48, 49, drive roller 50 and lower guide roller 58, as a whole, constitute a transfer means 61 for transferring the ribbon-like unvulcanized rubber member 37 toward the winding body 12, and separating the unvulcanized rubber member 37 from the liner 36 at the transfer terminal end 47 closest to the winding body 12.

Reference numeral 64 denotes a winding roller arranged close to the transfer terminal end 47 of the liner 36. The winding roller 64 has a rotational shaft 65, both ends of which are rotatably supported by the turntable 25. The winding roller 64 has a rotational axis which is situated in a horizontal plane that includes the rotational axis of the winding body 12. The winding roller 64 has a portion situated on the side of the winding body 12, which portion projects from the turntable 25. In this instance, the winding roller has an outer diameter which is larger than the minimum distance between the winding body 12 and the transfer terminal end of the liner 36 during the winding of the unvulcanized rubber member 37. Thus, part of the outer peripheral surface 64a of the winding roller 64 extends so as to bridge the transfer terminal end 47 and the winding body 12.

Figure 2:
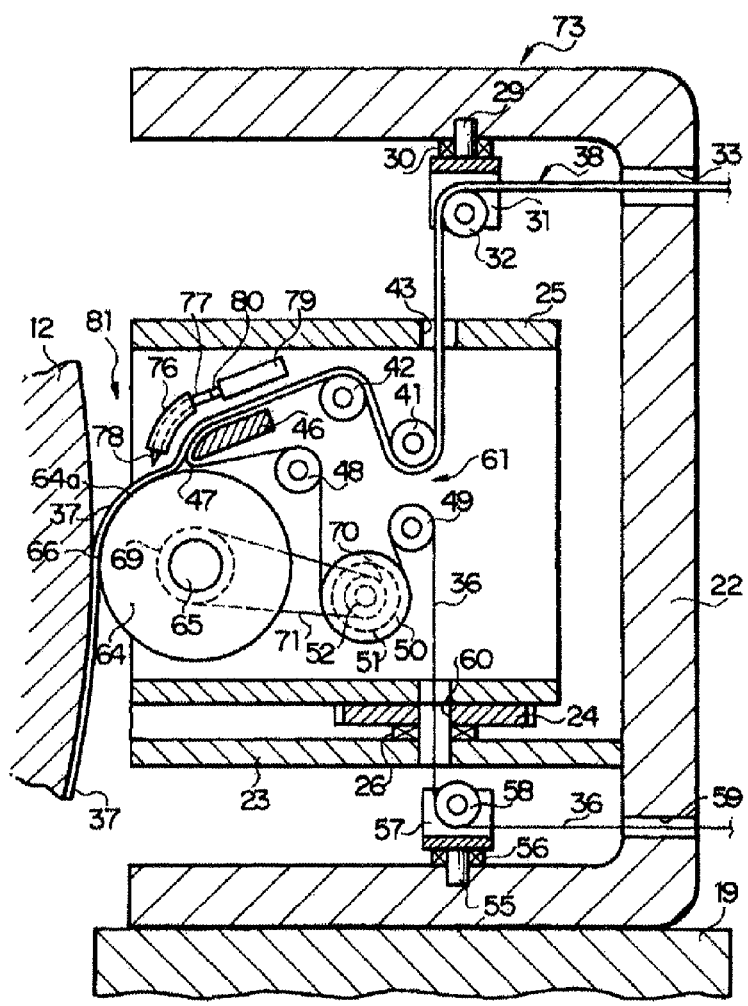
FIG. 2 is a longitudinal sectional view showing the arrangement of the support frame and associated elements.

Consequently, the unvulcanized rubber member 37 separated from the liner 36 as described above is passed immediately after the separation, from the transfer terminal end 47 onto the outer peripheral surface 64a of the winding roller 64, and then transferred to the winding body 12 by the rotation of the winding roller 64, as being adhered to the winding roller with a weak adhesion force. In this instance, as the unvulcanized rubber member 37 reaches a pressing point 66 intersecting the plane that includes the rotational axes of the winding body 12 and the winding roller 64, the unvulcanized rubber member 37 is urged and press-fitted by the winding roller 64 with the outer surface of the winding body 12. On this occasion, since the winding body 12 and the winding roller 64 are rotated in opposite directions, i.e., in the clockwise direction in the case of the winding body 12 and counterclockwise in the case of the winding roller 64 as seen in FIG. 2, the unvulcanized rubber member 37 is wound by the winding roller 64, onto the winding body 12 in the circumferential direction on the outer surface.

Reference numeral 69 denotes a one-way clutch secured to the rotational shaft 65 of the winding roller 64. A timing belt 71 is passed across the one-way clutch 69 and a pulley 70 fixedly secured to the output shaft 52 of the drive motor 51. In this instance, the one-way clutch 69 transmits driving power from the drive motor 51 to the winding roller 64 such that the winding roller is rotated with a peripheral speed at the outer peripheral surface 64a (i.e. the winding speed of the unvulcanized rubber member 37), which is same as the peripheral speed at the outer peripheral surface of the winding body 12 at the pressing point 66, in order to highly precisely wind the unvulcanized rubber member 37 about the winding body 12. Furthermore, if the winding roller 64 continues rotation even when the operation of the drive motor 51 is stopped, the one-way clutch 69 undergoes a free rotation to interrupt power transmission to the winding roller 64 from the drive motor 51. In a variation according to the present invention, the one-way clutch may be provided for the output shaft 52 of the drive motor 51.

In this way, if the drive motor for applying driving force to the transfer means 61 (liner 36) and the drive motor for applying driving force to the winding roller 64 are consolidated as a commonly used single drive motor 51, it is possible to decrease the number of expensive drive motors and readily reduce the installation cost. When the drive motor is operated to move the lower plate 17 in the fore-and-aft direction as being guided by the guide rails 16 and to further move the upper plate 19 in the left-to-right direction as being guided by the guide rails 18, it is possible to move the support plate 22, the turntable 25, the transfer means 61 and the winding roller 64 along the outer surface of the winding body substantially in the axial direction, or in the meridian direction as in the illustrated embodiment, while maintaining constant the distance between the outer surface of the winding body 12 and the stationary shafts 29, 55.

The external gear 24 described above is in mesh with an external gear which is fixedly secured to an output shaft of a drive motor (not shown) which, in turn, is secured to the support frame 22. Thus, if the drive motor is operated while the winding roller 64 and associated elements are being moved along the outer surface of the winding body 12 in the meridian direction as described above, the turntable 25 and the winding roller 64 are bodily rotated about the center axis of the bearing 26. On this occasion, the winding roller 64 is rotated so that its rotational axis is brought to have an orientation parallel with a tangent in the meridian direction relative to the outer surface of the winding body 12.

Consequently, during the winding of the unvulcanized rubber member 37 around the winding body 12, if the winding roller 64 is moved along the outer surface of the winding body 12 substantially in the axial direction of the winding body 12 in the horizontal plane, and the winding roller 64 is simultaneously rotated while keeping the parallel relationship with the tangent relative to the outer surface of the winding body 12, the unvulcanized rubber member 37 successively separated from the liner 36 by the separating member 46 is helically wound by the winding roller 64 around the winding body 12 multiple times while being shifted in the width direction of the unvulcanized rubber member 37, so as to form tire constitutive members about the winding body 12, such as inner liner member, top tread member, side tread members, etc.

In this instance, the tire constitutive members may be formed by performing the winding while bringing the side edges of the neighboring unvulcanized rubber members 37 into abutment with each other. Alternatively, the tire constitutive members may be formed performing the winding while superimposing the side edges of the neighboring unvulcanized rubber members 37. Incidentally, the swivel movement of the winding roller 64 about the bearing 26 is allowed without any particular problems, since the narrow strip member 38 is twisted between the upper guide roller 32 and the guide roller 41, and the liner 36 is twisted between the guide roller 49 and the lower guide roller 58.

The guide rails 16, 18, the lower and upper plates 17, 19, the support plate 22, the support plate 23, the external gear 24, the turntable 25, the bearing 26, the drive motor and the screw mechanism, as a whole, constitute a diagonal waving means 73 for moving at least the separating member 49 and the winding roller 64, or moving the separating member 49, the winding roller 64 and the liner 36 on the side of the winding body 12 with reference to the upper and lower guide rollers 32, 58 as in the illustrated embodiment, along the outer surface of the winding member 12 and thereby winding the unvulcanized rubber member 37 multiple times around the winding body 12 while shifting the unvulcanized rubber member 37 in the width direction.

It is noted that the unvulcanized rubber member 37 may be comprised of a strip-like rubber with a small number of reinforcing cords embedded therein to extend in the longitudinal direction. In this instance, it is possible to form a bead core by winding the unvulcanized rubber member 37 multiple times in the bead portion, and also to form a belt reinforcing layer by winding the unvulcanized rubber member 37 multiple times in the tread portion so as to reinforce belt layers.

As described above, the winding roller 64 is arranged close to the transfer terminal end 47 of the liner 36 and has a diameter larger than the distance between the winding body 12 and the transfer terminal end 47 of the liner 36. Furthermore, the winding roller 64 is arranged so that the outer peripheral surface partly extends to bridge the transfer terminal end 47 and the winding body 12. As a result, the unvulcanized rubber member 37 passed from the transfer terminal end 47 of the liner 36 is transferred to the outer peripheral surface of the winding roller 12 by the rotation of the winding roller 12 and urged and press-fitted to the winding body 12. Thus, the unvulcanized rubber member 37 is transferred from the transfer terminal end 47 of the liner 36 to the outer peripheral surface of the winding roller 12, while being restrained by the outer peripheral surface of the winding roller 12. As a result, even when vibration is applied to the transfer means 61 due to diagonal waving by the diagonal waving means 73, it is possible to positively avoid occurrence of inaccuracy in the winding position or the winding shape of the unvulcanized rubber member 37.

Moreover, the unvulcanized rubber member 37 is once separated from the separating member 46 at the transfer terminal end 47 of the liner 36 and then transferred by the winding roller 64 to the winding body 12 so as to be wound around the winding body 12. Thus, even when the adhesion force between the liner 36 and the unvulcanized rubber member 37 is strong, the influence of the strong adhesion force is substantially negligible by the above-mentioned separation. Therefore, the unvulcanized rubber member 37 is prevented from stretching and floating while being wound onto the winding body 12. This serves to improve the quality of the green tires.

Reference numeral 76 denotes a guide member that is secured to the turntable 25 and situated immediately above the separating member 46 and the winding roller 64 so as to extend in arcuate manner along the upper surface of the separating member 46. A flexible wire 77 is slidably inserted into the guide member 76 and has a distal end close to the winding roller 64, to which a cutting blade 78 is fixedly secured. Reference numeral 79 denotes a cylinder that is secured to the turntable 25. The cylinder 79 includes a piston rod having a distal end, which is connected to the rear end of the flexible wire 77.

As a result, during the period wherein the rotations of the winding body 12 and the winding roller 64 are being stopped, if the cylinder 79 is operated so as to advance the piston rod 80, the butting blade 78 is urged against the outer peripheral surface 64a of the winding roller 64 bridging the separating member 46 and the winding body 12, thereby cutting the unvulcanized rubber member 37 in the width direction, which is in adhesion to that location of the outer peripheral surface 64a. The guide member 76, the flexible wire 77, the cutting blade 78 and the cylinder 79, as a whole, constitute the cutting means 81, which is operated when the winding of the unvulcanized rubber member 37 onto the winding body 12 is stopped, so as to cut the unvulcanized rubber member 37 at a location between the transfer terminal end 47 of the liner 36 and the pressing point 66 of the unvulcanized rubber member 37 against the winding body 12.

In this instance, since the cutting of the unvulcanized rubber member 37 is performed by urging the cutting blade 78 of the cutting means 81 against the winding roller 64, it is possible to utilize the adhesion force between the liner 36 and the unvulcanized rubber member 37 to hold the latter during the cutting, so as to minimize dislocation of the leading end and the trailing end of the unvulcanized rubber member 37 during the cutting, thereby effectively suppressing unexpected deformation of the unvulcanized rubber member 37 or its re-adhesion to the liner 36.

When the unvulcanized rubber member 37 is cut by the cutting means 81 on the winding roller 64 as described above, a residual portion 84 (see, FIG. 4) is formed between the pressing point 66 and the trailing end 37b of the unvulcanized rubber member 37, which is not yet wound onto the winding body 12. Such residual portion 84 an be wound onto the winding body 12 when the transfer by means of the transfer means 61 is stopped, by rotating the winding body 12 and the winding roller 64 in reverse directions.

In this way, by operating the winding body 12, winding roller 64 and the transfer means 61 after cutting the unvulcanized rubber member 37, it is possible readily avoid occurrence of defective adhesion of the residual portion 84 (trailing end) of the unvulcanized rubber member 37 or dislocation of the set position of the leading end, as compared to the case wherein the unvulcanized rubber member 37 after having been cut is supplied to the winding body 12 in the state as it is, i.e. the state wherein the leading end and the trailing end are in abutment with each other.

When the residual portion 84 is wound onto the winding body 12 as described above, it is preferred that only the winding body 12 is driven into rotation so that the winding roller 64 undergoes a following rotation through the unvulcanized rubber member 37 interposed therebetween. This is because the winding body 12 and the winding roller 64 are different from each other in terms of the inertia mass, besides that their respective drive motors are different from each other in the output characteristics. As such, it would be generally difficult to drive the winding body 12 and the winding roller 64 with the same peripheral speed, immediately after starting the winding of the residual portion 84. However, the preferred configuration as described above serves to readily ensure that the winding body 12 and the winding roller 64 are driven at the same peripheral speed, immediately after starting the winding of the residual portion, thereby improving the adhesion of the residual portion.

On the other hand, however, if the drive motor for applying driving power to the liner 36 and the drive motor for applying driving power to the winding roller 64 are comprised of a commonly used single motor 51 as described above, the following rotation of the winding roller 64 may be transmitted to the drive motor 51 and the transfer means 61 to cause running of the liner 36. Thus, in the illustrated embodiment, a one-way clutch 69 is interposed between the winding roller 64 and the drive motor 51 as described above, such that the following rotation of the winding roller 64 is interrupted by the one-way clutch 69 and prevented from being transmitted to the drive motor 51 and the transfer means 61, thereby allowing the undisturbed following rotation of the winding roller 64 without particular problems.

The operation of the embodiment as described above will be explained below. It is assumed that the winding body 12 is supplied with driving force from the driving section 11 to rotate about its center axis, and the winding roller 64 is supplied with driving force from the common drive motor 15 to rotate about its center axis. In this instance, the narrow strip member 38 (liner 36) is caused to run in the longitudinal direction while successively contacting with the upper guide roller 32 and the guide rollers 41, 42 so as to transfer the unvulcanized rubber member 37 toward the winding body 12, before it is turned back in hairpin manner by the separating member 46, when the unvulcanized rubber member 37 is separated from the liner 36.

The unvulcanized rubber member 37 separated from the liner 36 as described above is passed to the outer surface 64a of the winding roller 64 immediately after the separation, before it is transferred to the winding body 12 by the rotation of the winding roller 64, in a state in which it is adhered to the outer surface 64a of the winding roller 64. When the unvulcanized rubber member 37 reaches the pressing point 66, it is urged by the winding roller 64 onto the outer surface of the winding body 12 and press-fitted thereto. On this occasion, the winding body 12 and the winding roller 64 are rotated in opposite directions so that the unvulcanized rubber member 37 is wound by the winding roller onto the outer surface of the winding body 12 in its circumferential direction.

In this way, since the unvulcanized rubber member 37 after the separation is transferred to the winding body while being restrained by the outer surface 64a of the winding roller 64, even when vibration is applied to the transfer means 61 due to diagonal waving by the diagonal waving means 73, it is possible to positively avoid occurrence of inaccuracy in the winding position or the winding shape of the unvulcanized rubber member 37. Moreover, since the unvulcanized rubber member 37 is once separated from the separating member 46 and then transferred by the winding roller 64 to the winding body 12 so as to be wound around the winding body 12, even when the adhesion force between the liner 36 and the unvulcanized rubber member 37 is strong, the winding onto the winding body 12 is substantially unaffected.

Figure 3:
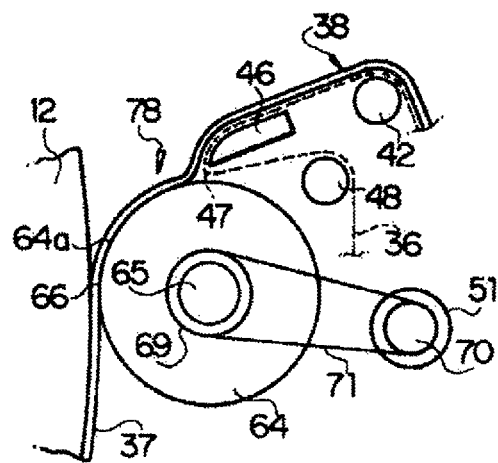
FIG. 3 is a side view showing the operation of the winding roller and associated elements.

Furthermore, since, during the winding, the diagonal waving means 73 is operated such that the winding roller 64 and the separating member 46 are moved along the outer surface of the winding body 12, while the external gear 24 is rotated to cause rotation of the winding roller 64 so as to be in parallel with the tangent with reference to the outer surface of the winding body 12, the unvulcanized rubber member 37 is wound multiple times around the winding body 12 while being shifted in the width direction, so that the desired tire constitutive member comprised of the unvulcanized rubber member 37 is formed around the winding body 12. On the other hand, the liner 36 after the separation is wound and collected by the winding means after successively contacting with the guide roller 48, the drive roller 50, the guide roller 49 and the lower guide roller 58. Such a state is shown in FIG. 3.

Figure 4:
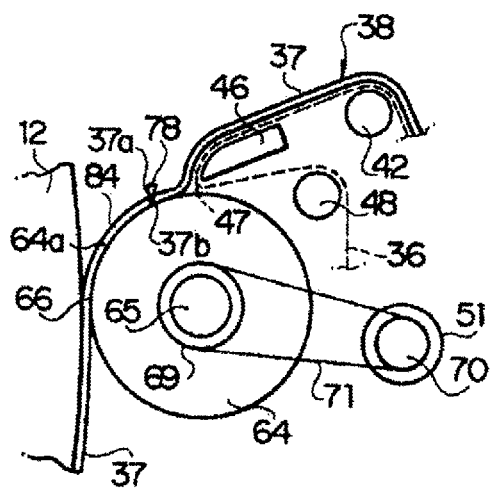
FIG. 4 is a side view showing the operation of the winding roller and associated elements.

Immediately before completion of formation of the tire constitutive member as described above, the rotation of the winding roller 64 and the winding body 12 and the operation of the transfer means 61 (or running of the liner 36) are temporarily stopped. The piston rod 80 of the cylinder 79 is then projected so as to urge the cutting blade 78 against the winding roller 64 at a location between the transfer terminal end 47 and the pressing point 66, thereby cutting the unvulcanized rubber member 37 in the width direction, which is in adhesion to the outer surface 64a of the winding roller 64 unvulcanized rubber member 37. Consequently, at such cutting position, the trailing end 37b of the unvulcanized rubber member 37, which had already been subjected to cutting, and the leading end 37a of the unvulcanized rubber member 37 supplied from the unwinding means are situated as being opposite to each other, while forming the residual portion 84 between the pressing point 66 and the trailing end 37b of the unvulcanized rubber member 37, which had already been subjected to cutting. Such a state is shown in FIG. 4.

Subsequently, in a state in which the operation of the drive motor 51 is stopped, i.e. the transfer of the unvulcanized rubber member 37 by the transfer means 61 is stopped, rotary driving force is applied only to the winding body 12 so as to rotate the winding body 12. On this occasion, since the unvulcanized rubber member 37 (residual portion 84) remains between the winding roller 64 and the winding body 12, the driving force from the winding body 12 is transmitted to the winding roller 64 through the unvulcanized rubber member 37 (residual portion 84) so that the winding roller 64 undergoes a following rotation with the same peripheral speed as the winding body 12. The residual portion 84 is thus wound around the winding body 12.

During such winding of the residual portion 84, if the rotation of the winding roller 64 is transmitted to the drive motor 51 and the transfer means 61 through the timing belt 71 to cause running of the liner 36, the leading end of the unvulcanized rubber member 37 may be fed to the winding body 12. However, in the illustrated embodiment, a one-way clutch 69 is interposed between the winding roller 64 and the timing belt 71 so as to interrupt transmission of the following rotation to the drive motor 51, in order to avoid occurrence of such a situation.

Figure 5:
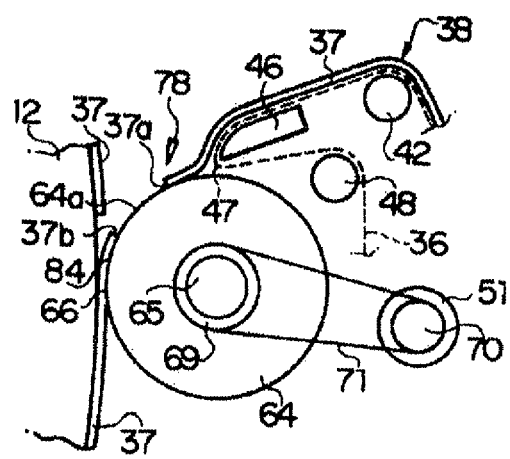
FIG. 5 is a side view showing the operation of the winding roller and associated elements.

Upon completion of cutting of the unvulcanized rubber member 37, the leading end of the unvulcanized rubber member 37 remains in adhesion to the outer periphery of the winding roller 64. Thus, if the winding roller 64 undergoes a following rotation while the operation of the transfer means 61 is stopped, unvulcanized rubber member 37 is separated from the outer periphery of the winding roller 64 and comes into sliding contact with the outer periphery of the winding roller 64. Consequently, as the transfer means 61 is subsequently operated to start the running of the liner 36, it is possible to avoid a situation in which the leading end of the unvulcanized rubber member 37 is dragged by the liner 36 and jammed between the separating member 46 and the winding roller 64. Such a state is shown in FIG. 5.

Figure 6:
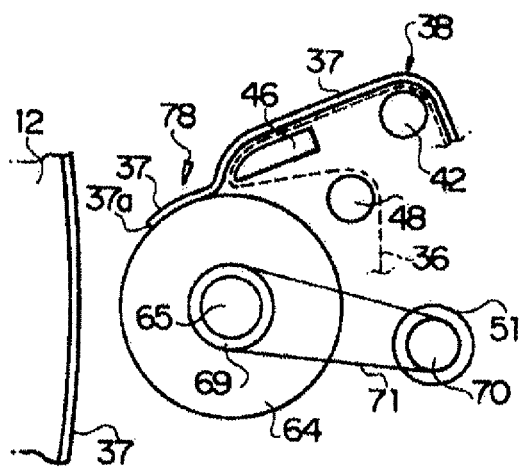
FIG. 6 is a side view showing the operation of the winding roller and associated elements.

In this way, when the winding of the residual portion 84 is completed, the diagonal waving means 73 is operated so that the support frame 22, the turntable 25, the transfer means 61 and the winding roller 64 are moves away from the winding body 12. The drive motor 51 is then operated to cause running of the liner 36 and to rotate the winding roller 64 so that the leading end of the unvulcanized rubber member 37 is separated from the liner 36 and a limited amount of the unvulcanized rubber member 37 is thereby supplied toward the winding body 12, for the preparation of a next winding. Such a state is shown in FIG. 6.

When the unvulcanized rubber member 37 is to be wound onto the winding body 12 once again, the support frame 22 and its associated elements are moved toward the winding body 12. The winding body 12, the driving roller 50 and the winding roller 64 are then rotated, while being moved by the diagonal waving means 73 along the outer surface of the winding body 12 in the manner described above. These operations are repeated multiple times to produce green tires by successive formation of the desired tire constitutive members around the winding body 12, followed by formation of carcass layers around the winding body 12, as well as beads and belt layer.

INDUSTRIAL APPLICABILITY

The present invention is generally applicable to various industrial fields wherein an unvulcanized rubber member is to be wound multiple times around a winding body.

The invention claimed is:

1. A method for producing green tires, comprising the steps of:
    transferring a ribbon-like unvulcanized rubber member towards a winding body by running a flexible liner along with the unvulcanized rubber member from a supply roll in its longitudinal direction, and separating the unvulcanized rubber from the liner at a transfer terminal end of the liner by turning back the liner by a strip-shaped separating member arranged close to the winding body; and
    using a winding roller arranged close to the transfer terminal end of the liner and having a diameter larger than a distance between the winding body and the transfer terminal end of the liner during winding of the unvulcanized rubber member, the winding roller having an outer peripheral surface which partly extends to bridge the transfer terminal end and the winding body, passing the separated unvulcanized rubber member onto the outer peripheral surface of the winding roller, rotating the winding roller so that the unvulcanized rubber member is transferred to the winding body while the winding body is rotating about its center axis so as to be urged and press-fitted to the winding body, and simultaneously moving the winding roller and the separating member along an outer peripheral surface of the winding body by a diagonal waving means, thereby winding the unvulcanized rubber member multiple times around the winding body while being shifted in a width direction.

2. An apparatus for producing green tires, comprising:
    a transfer means including a flexible liner movable in a longitudinal direction for transferring a ribbon-like unvulcanized rubber member along with the flexible liner from a supply roll toward a winding body rotatable about a center axis, and a strip-shaped separating member arranged close to the winding body, for turning back the liner and thereby separating the unvulcanized rubber member from the liner at a transfer terminal end of the liner;

a rotatable winding roller arranged close to the transfer terminal end of the liner and having a diameter larger than a distance between the winding body and the transfer terminal end of the liner during winding of the unvulcanized rubber member, the winding roller having an outer peripheral surface which partly extends to bridge the transfer terminal end and the winding body, so that the unvulcanized rubber member passed from the transfer terminal end of the liner is passed onto the outer peripheral surface of the winding roller during rotation thereof, and urged and press-fitted to the winding body; and a diagonal waving means for moving at least the winding roller and separating member along an outer peripheral surface of the winding body, thereby winding the unvulcanized rubber member multiple times around the winding body while being shifted in a width direction.

3. The apparatus for producing green tires according to claim 2, further comprising:

a cutter means for cutting the unvulcanized rubber member while the winding of the unvulcanized rubber member onto the winding body is stopped, at a location between the transfer terminal end of the liner and a pressing point of the unvulcanized rubber member with respect to the winding body, wherein the winding body and the winding roller are rotated after the unvulcanized rubber member has been cut by the cutting means and the transfer of the unvulcanized rubber member by the transfer means is stopped, so that a residual portion of the unvulcanized rubber member extending between the pressing point and a trailing end of the cut unvulcanized rubber member is wound onto the winding body.

4. The apparatus for producing green tires according to claim 3, wherein the cutting of the unvulcanized rubber member is performed by urging a cutting blade of the cutter means against the winding roller.

5. The apparatus for producing green tires according to claim 2, wherein only the winding body is driven into rotation during the winding of a residual portion so that the winding roller undergoes a following rotation through the unvulcanized rubber member.

6. The apparatus for producing green tires according to claim 5, further comprising:

a drive motor for applying a driving force to the transfer means, a drive motor for applying a driving force to the winding roller, said drive motors being in a form of a common drive motor, and a one-way clutch arranged between the winding roller and the common drive motor, for interrupting power transmission from the common drive motor to the winding roller during the following rotation and to the transfer means.

7. The apparatus for producing green tires according to claim 3, wherein only the winding body is driven into rotation during the winding of the residual portion so that the winding roller undergoes a following rotation through the unvulcanized rubber member.

8. The apparatus for producing green tires according to claim 4, wherein only the winding body is driven into rotation during the winding of the residual portion so that the winding roller undergoes a following rotation through the unvulcanized rubber member.

* * * * *